Nov. 26, 1935.   W. C. MacFARLANE   2,021,961
METHOD OF TREATING TACKY MATERIAL
Original Filed Aug. 13, 1931   2 Sheets-Sheet 2
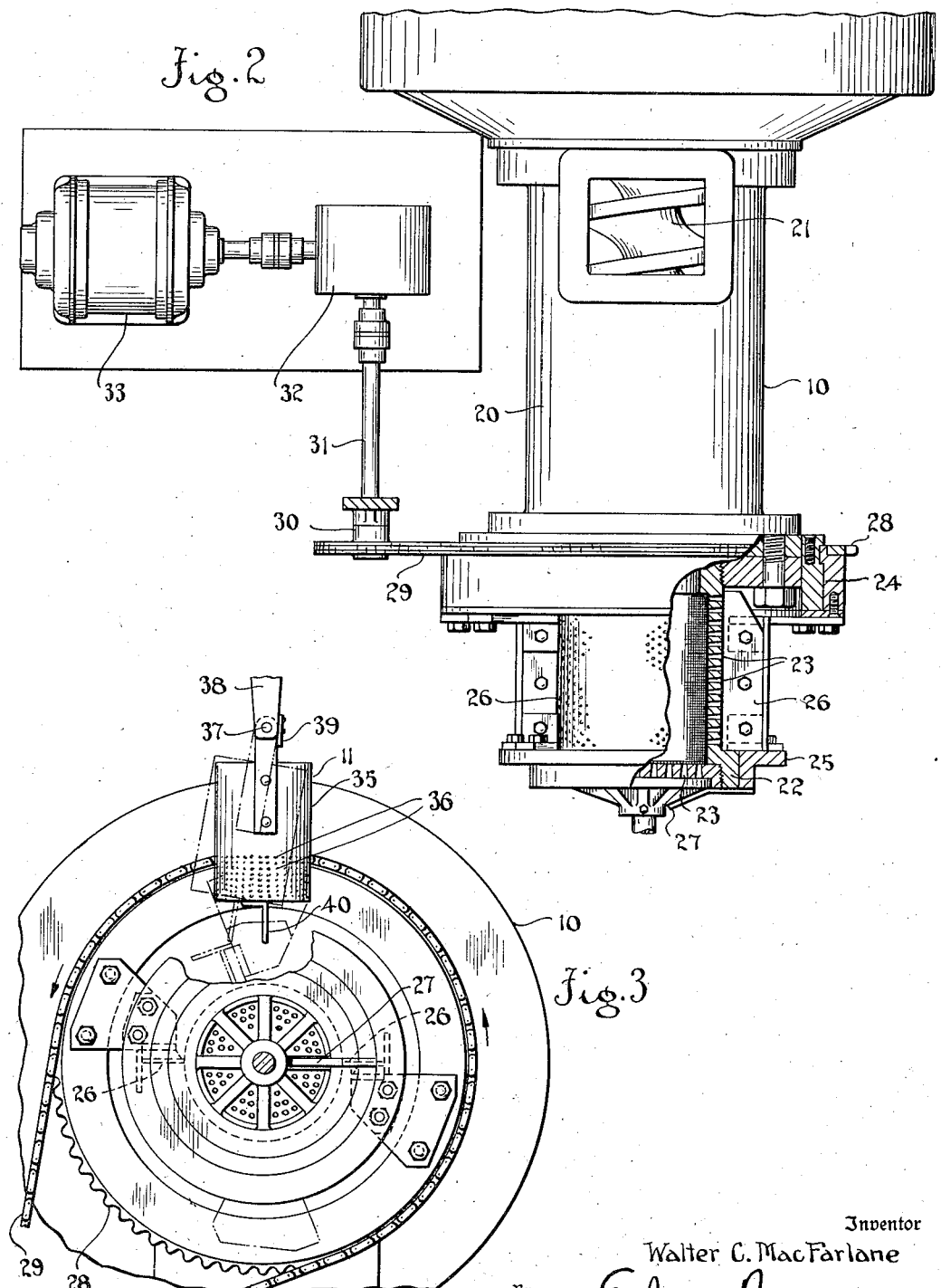
Inventor
Walter C. MacFarlane
By Ely Barrow
Attorneys Patented Nov. 26, 1935

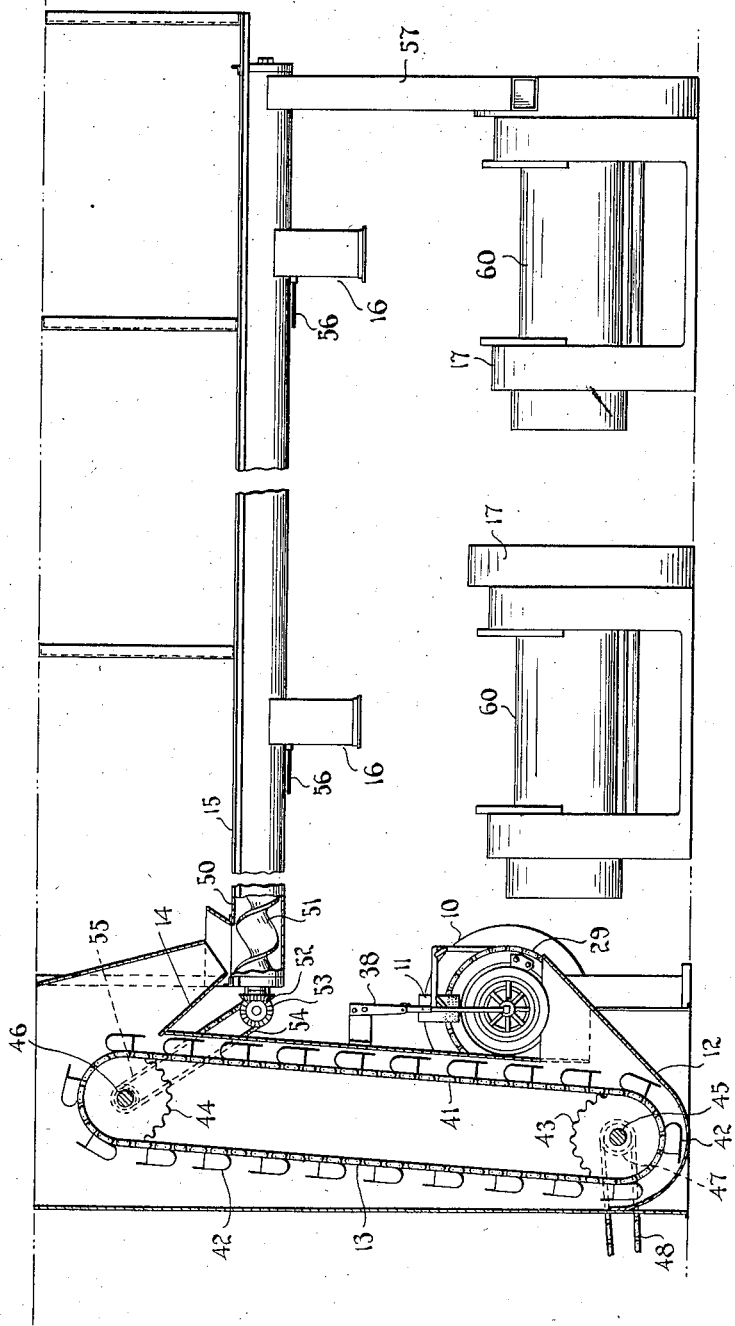

2,021,961

UNITED STATES PATENT OFFICE 2,021,961

METHOD OF TREATING TACKY MATERIAL

Walter C. MacFarlane, South Gate, Calif., assignor to The Xylos Rubber Company, Akron, Ohio, a corporation of Ohio Original application August 13, 1931, Serial No. 556,730. Divided and this application September 3, 1932, Serial No. 631,675

3 Claims. (Cl. 18—50)

This invention relates to methods for treating tacky material, and more especially it relates to procedure for treating and handling plastic rubber composition. This application is a division of my co-pending application Serial No. 556,730 filed August 13, 1931 which has become Patent 1,952,556.

The chief objects of the invention are to facilitate the handling of plastic, tacky material; to permit the use of mechanical means for handling the material; to provide for continuous operation of a series of mechanisms for performing successive operations upon the material being treated or worked; and to provide improved procedure for accomplishing the foregoing objects.

Of the accompanying drawings:

Figure 1 is a somewhat diagrammatic elevation of apparatus adapted to carry out the invention, in its preferred form;

Figure 2 is a plan view, partly broken away and in section, of extruding mechanism constituting a part of the apparatus; and Figure 3 is an end elevation of the apparatus shown in Figure 2, and a dusting device associated therewith, parts being broken away.

Referring to Figure 1 of the drawings, 10 represents generally an extruding machine for plastic material, 11 is a dusting device positioned above the delivery head thereof and actuated periodically by the extruding mechanism, 12 is a hopper at the delivery end of the extruding machine receiving material extruded therefrom, 13 is a bucket elevator that removes material from the hopper and deposits it on an elevated, inclined chute 14, 15 is a horizontal conveyor that receives material from the chute 14 and moves it past a series of delivery spouts 16, 16, and 17, 17 are rubber-working machines beneath the delivery spouts 16 and adapted to receive material therefrom.

The extruding machine 10 is of the type known in the rubber industry as a "strainer" and is used for refining and removing foreign matter from plastic unvulcanized rubber composition. It comprises the usual housing 20, driven feed screw 21, and a cylindrical head 22 that is formed with apertures 23, 23 in its peripheral wall and end wall, the plastic composition being extruded through said apertures. Journaled upon the inner end of the head 22 for rotative movement thereupon is a collar 24, and a second collar 25 is journaled upon the outer end of the head. The collars 24, 25 support a pair of oppositely disposed blades 26, 26, the cutting edges of which are adjacent the peripheral surface of the head 22, and a radially disposed blade 27 is mounted upon the collar 25 and extends across the front end of the head. The collar 24 is rotated, to move the blades in an orbit about the head, by means of a sprocket 28 that is secured to said collar and connected by a sprocket chain 29 with a sprocket 30 on one end of a countershaft 31, the latter being connected, through a reduction gear device 32, with a driving motor 33.

The collar 24 is driven independently of the feed screw 21 so that their relative speeds may be varied at will, whereby it is possible to sever the material extruded from the apertures 23 to any length desired, the severed material, in the form of cylindrical pellets, falling into the hopper 12.

The dusting device 11 comprises a receptacle 35 that is formed with a multiplicity of apertures 36, 36 in its sidewalls. The receptacle is pivotally supported at 37 from a suitable overhead bracket 38, and a stop-plate 39 is so positioned on said bracket as to limit the movement of the receptacle to one side of the vertical position. A suitable plate or finger 40 is secured to the bottom of the receptacle 35 and projects downwardly therefrom into the orbit of the blades 26. The arrangement is such that the plate 40 is periodically engaged by the blades 26, moving in the direction indicated by the arrows in Figure 3, to tilt the receptacle 35 to the position shown in broken lines in said figure, the receptacle falling back to normal vertical position as the blades pass from engagement with said plate and coming to a sudden stop against the stop-plate 39. The receptacle 35 is filled with a suitable lubricant such as soapstone dust, and the jar caused by swinging the receptacle and suddenly stopping it against the plate 39 causes a quantity of the soapstone dust to be shaken from the receptacle, said dust falling upon the head 22 of the extruding machine and upon the plastic material issuing from the apertures 23 thereof.

Thus the extruded material that is severed by the blades 26, and falls into the hopper 12 is sufficiently dusted to remove most of the tackiness of the material, with the result that the pellets do not adhere to each other and are easily handled by elevator 13 and other conveying mechanism.

The bucket elevator 13 comprises the usual pair of endless chains such as the chain 41, and buckets 42, 42 mounted upon a lower and an upper sprocket 43, 44 respectively, and said sprockets are mounted upon suitably journaled shafts 45, 46 of which the shaft 45 also is provided with a sprocket 47 that is connected by a sprocket chain 48 with a source of driving power (not shown).

As hereinbefore stated, material removed from the hopper 12 by the buckets 42 is deposited by the latter upon an elevated inclined chute 14, the latter communicating with the receiving end of an elevated horizontal conveyor 15. The latter comprises a tubular housing 50 in which is rotatably mounted a helical feed screw 51 that extends from end to end thereof, the end of the feed screw nearest the chute 14 being provided with a bevel gear 52 that is meshed with a bevel gear 53, and the latter is driven by a sprocket chain 54 that is trained about a sprocket 55 mounted upon the upper shaft 46 of the bucket elevator 13. The delivery spouts 16 project downwardly from the housing 50, and a suitable shutter or slide 56 is provided for each spout 16, so that the spout may be opened to or shut off from the interior of the housing 50. A normally open spout 57 extends downwardly from the end of the housing 50 remote from its work-receiving end, and any material that is fed through the housing and not removed through the spouts 16 is ejected through spout 57. A suitable receptacle (not shown) may be provided for receiving this surplus material, but preferably there are provided enough rubber-working machines 17 to utilize all the material delivered from the strainer 10.

The rubber-working machines 17 as shown herein are refining mills, each of which comprises a pair of rolls, such as the roll 60, which rolls are positioned close together and are adapted to form a thin sheet of stock from the material delivered to them from the chute 16. The sheeted stock is rolled onto a shell or drum, and is split and stripped therefrom in the form of a slab when it has attained the desired thickness.

However, the invention is not limited to the use of the refining mills shown, since other rubber-working mechanism, such as tubing machines or strainers, may be used in their stead.

The operation and procedure of the invention easily will be understood from the foregoing description of the apparatus. The feature of applying a lubricating powder to the work, the latter being in the form of pellets, causes the pellets to be non-adherent so that they may be handled mechanically, with the result that substantial saving of manual labor is effected.

Modifications may be resorted to within the scope of the appended claims which are not limited wholly to the specific construction shown or exact procedure described.

What is claimed is:

1. The method of treating reclaimed rubber wherein the rubber is strained to remove foreign particles, extruded into strip form, and subsequently refined by a thin sheet milling operation, comprising the process of progressively severing the extruded strips of rubber to form a plurality of discontinuous particles, and dusting said particles as they are being severed to prevent same from adhering to each other, and conveying said discontinuous particles in a continuous stream from said straining and extruding operation to said refining operation, and whereby said stream may be selectively diverted to a plurality of refining stations.

2. The method of conveying tacky rubber compounds which comprises forming the compound into continuous strips, cutting said strips to form discontinuous discrete particles of rubber, simultaneously dusting the tacky discrete particles to prevent readhesion, conveying said dusted particles in a continuous stream to a group of a plurality of stations for performing a subsequent operation thereon, and selectively diverting said continuous stream to individual stations of said group.

3. The method of refining tacky reclaimed rubber, which comprises straining the rubber to remove foreign particles, extruding the rubber from said strainer in strip form, cutting the rubber strips to form discontinuous discrete rubber particles, dusting said particles simultaneously with the cutting operation to provide non-adhering surfaces thereon, conveying the dusted particles in a continuous stream to a group of thin sheet refining mills and selectively diverting the continuous stream of rubber particles to individual mills in said group.

WALTER C. MacFARLANE.